Patented Oct. 22, 1935

2,018,645

UNITED STATES PATENT OFFICE 2,018,645

RUBBER CEMENT OF HIGH RUBBER CONTENT AND LOW VISCOSITY

Ira Williams, Woodstown, and Carroll Cummings Smith, Carneys Point, N. J., assignors to E. I. du Pont de Nemours & Company, Wilmington, Del., a corporation of Delaware No Drawing. Application August 28, 1934, Serial No. 741,824

20 Claims. (Cl. 134—17)

This invention relates to rubber solutions and more particularly to the production of rubber cements of high rubber content and low viscosity.

Rubber cements are usually prepared by stirring rubber into solvents such as petroleum spirits, benzene, carbon tetrachloride or the like until a homogeneous solution is obtained. The viscosity of these products may vary from thick dough-like mixtures to thin cements which will pour with relative ease.

In many cases, it is desirable to obtain the maximum rubber content consistent with a viscosity which will permit satisfactory use of the cement. For example, in the process of dipping forms into rubber cement for the purpose of producing gloves, balloons or the like, it is necessary to raise the form and permit the cement to flow from the form until a thin uniform layer remains which, by loss of solvent, leaves a thin layer of rubber. When the layer of rubber is dry, the form is again dipped and a second layer of rubber is deposited. This procedure is continued until a layer of rubber of the desired thickness results. The number of dips required is greatly reduced when cements of high rubber content are employed.

In order that a large amount of rubber may be contained in a cement of a given viscosity, it has been the general practice to subject the rubber to a long and sometimes severe milling operation. This excessive milling is extremely harmful to the rubber tending to break down the rubber whereby the final product is of very inferior quality and much of the desirable properties of the rubber are lost. Further, the degree of softening of the rubber and the amount of rubber which it is possible to cause to go into solution by this method is limited.

An object of the present invention is to provide a mobile solution of rubber of a concentration sufficient for practical use by methods requiring little or no milling of the rubber. A further object of this invention is to secure rubber cements of ordinary concentration but of greatly reduced viscosity. A still further object is to produce rubber cements of the usual viscosity suited to the particular use but of a greatly increased rubber content. Other objects are to produce new compositions of matter and to advance the art. Still other objects will appear hereinafter.

These objects may be accomplished in accordance with our invention which comprises incorporating unsymmetrically substituted hydrazine compounds in a rubber cement.

The hydrazine compounds of our invention comprise the class of hydrazines represented by the formula

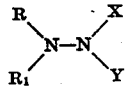

and salts thereof, wherein R represents an alkyl, aralkyl or aryl nucleus; $R_1$ represents hydrogen or an alkyl, aralkyl or aryl nucleus; X represents hydrogen, one valence of a doubly bonded carbon atom or an alkyl, aralkyl or aryl nucleus but must be of a different class than R when $R_1$ is hydrogen; and Y may be hydrogen or one valence of a doubly bonded carbon atom. R and $R_1$ may also represent terminal carbon atoms of a cyclic group in which the nitrogen to which they are attached forms part of the cycle as in the morpholyl, piperidyl, and like groups.

The statement, that X must be of a different class than R when $R_1$ is hydrogen, means that X must not be aryl when R is aryl and $R_1$ is hydrogen; that X must not be alkyl when R is alkyl and $R_1$ is hydrogen; and X must not be aralkyl when R is aralkyl and $R_1$ is hydrogen.

One valence of a doubly bonded carbon atom, as employed in the above definitions and in the claims, will be understood to include compounds in which both the X and the Y valences are connected to the same carbon atom as in compounds represented by the formula

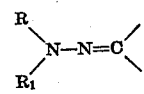

and to include compounds in which the valence is of a carbon atom which is doubly bonded to some element other than carbon as in the compounds represented by the formulæ

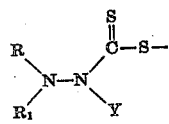

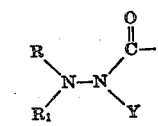

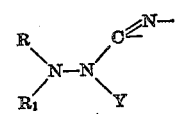

By the expression "an alkyl, aralkyl or aryl nucleus", it will be understood that the indicated group is bonded to the nitrogen directly by means of a carbon atom of such nucleus. Such nuclei may contain hydroxy, alkoxy, nitro, halogen or amino substituents. Also, the term "alkyl" includes both saturated and unsaturated aliphatic radicals.

Rubber cements containing these compounds have many advantages over the ordinary type. For example, when any one or a combination of our compounds is added to a rubber cement, the viscosity of the cement begins to decrease and continues to decrease at a gradually decreasing rate until an apparent equilibrium is reached, after which, little or no further decrease in the viscosity takes place. The length of time required to reach this equilibrium varies considerably for different compounds and depends largely upon the temperatures and the amount of agent employed. A beneficial decrease in viscosity will, in general, be noticed in periods of time which may vary from 15 minutes to two days. Further, the amount of the decrease in the viscosity, which will be obtained over a given length of time, will vary with the amount of hydrazine compound employed. However, the decrease in viscosity with increased amounts of hydrazine compound is not in proportion to the compound added. The amount of compound to be added may be varied within an extremely wide range depending upon the ingredients of the solution and the desire of the user. However, for economical reasons, it will generally be found that from about .1 to about 5% of the hydrazine compound based on the rubber in the solution will be sufficient for most purposes. In certain instances, it may be found advantageous to employ 5% or more of the compound based on the cement to effect the desired decrease in viscosity.

This action of our compounds, in reducing the viscosity of the rubber cements, may be employed to advantage in the preparation of cements having higher concentrations of rubber than has been permissible heretofore. For example, the use of our compounds will permit the production of rubber cements which will flow readily with a rubber content of 40% or higher. On the other hand, it is possible to prepare rubber cements having a rubber content of about 10% that are sufficiently fluid to penetrate such porous objects as paper and leather with considerable ease. Forms dipped in these cements will drain more evenly and without the inclusion of bubbles which usually cause defects in rubber articles made by dipping the forms in rubber cements such as have heretofore been employed. The more concentrated cements, obtainable with the use of our compounds, permit building up the required thickness of rubber with a fewer number of dips and with a consequent saving in time and solvent. Furthermore, the use of our compounds permits the preparation of cements without extended milling of the rubber. Accordingly, the final product will have greatly improved physical properties.

In order to more clearly illustrate our invention, the preferred embodiments thereof, and the advantageous results to be obtained thereby, the following examples are given:

Example 1

A rubber cement was prepared by dissolving 10 parts of milled smoked sheet rubber in 90 parts of benzene. To portions of this cement, various of our agents were added. After 12 hours, the relative viscosity of the treated and untreated cement was determined by observing the time required for a steel ball to fall through a column of cement 50 centimeters high. The results are recorded in the following table in which the viscosity is expressed by the number of seconds required for the steel ball to fall through the column of the cement.

| Material added | Percent added based on weight of cement | Relative viscosity in seconds |
|---|---|---|
| None | 00. | 107 |
| Phenyl hydrazine | .3 | 3 |
| Do | .11 | 7 |
| Phenyl hydrazine hydrochloride | .03 | 24 |
| o-tolyl hydrazine | .25 | 3 |
| a-naphthyl hydrazine | .1 | 19 |
| a-naphthyl hydrazine hydrochloride | .15 | 7 |
| o-xenyl hydrazine | .3 | 5 |
| Asymmetrical diphenyl hydrazine | .3 | 17 |
| 2-5-Dichlor phenyl hydrazine | .3 | 39 |
| Ethyl sulphonyl derivative of 2-5-dichlor phenyl hydrazine | .25 | 60 |
| Benzoyl derivative of 2-5-dichlor phenyl hydrazine | .25 | 88 |
| m-nitro phenyl hydrazine | .25 | 40 |
| p-nitro phenyl hydrazine | .04 | 40 |
| Phenyl dithio carbazimic phenyl hydrazine | .10 | 2 |
| Phenyl hydrazine formaldehyde reaction product | .15 | 9 |
| Methyl propyl ketone phenyl hydrazone | .05 | 4 |
| Phenol salt of phenyl hydrazine | .04 | 11 |
| b-naphthol salt of phenyl hydrazine | .05 | 19 |
| Phenyl hydrazine $CO_2$ addition product | .02 | 22 |
| N,N' b-hydroxy ethyl phenyl hydrazine | .10 | 6 |
| Asymmetrical dilauryl hydrazine | .15 | 45 |
| Phenyl hydrazine stearate | .30 | 25 |
| Phenyl hydrazine $SO_2$ addition product | .4 | 11 |

Example 2

10 grams of unmilled smoked sheet rubber were cut into strips 5 mm. wide and placed in 90 grams of benzene. A second 10 grams in 90 grams of benzene were treated with .06 gram of phenyl hydrazine. After three days, the treated sample was in the form of a cement which could be easily poured while the untreated sample had merely swollen to a stiff jelly.

Example 3

A batch of smoked sheet rubber was milled on the laboratory mill at 70° C. for 10 minutes. 40 grams of this rubber were added to 60 grams of benzene containing .3 gram of phenyl hydrazine. After three days, the resulting cement would pour readily while a similar untreated sample had merely swollen to a stiff jelly.

Example 4

A rubber cement prepared with pale crepe and gasoline, when measured under the conditions of Example 1, had a relative viscosity of 97 seconds. To this cement, .3% of o-xenyl hydrazine was added and, after 12 hours, the viscosity had dropped to 31 seconds.

Example 5

A solution of rubber in carbon tetrachloride had a relative viscosity, when tested under the conditions of Example 1, of 118 seconds. 12 hours after being treated with .20% phenyl dithio carbazimic phenyl hydrazine, the viscosity was reduced to 11 seconds.

Example 6

A rubber solution prepared with smoked sheets and carbon disulfide had a relative viscosity of 78 seconds. To this cement, .10% of o-tolyl hydrazine was added. This reacted to form the o-tolyl hydrazonium salt of the dithio carbamic acid of o-tolyl hydrazine. After 16 hours, the viscosity of the cement had been reduced to 6 seconds.

Example 7

Smoked sheet rubber was treated on the mixing mill with .25% of phenyl hydrazine. After 12 hours, this rubber was used to prepare the following compound:

| | |
|---|---|
| Rubber | 100 |
| ZnO | 4 |
| Sulfur | 2 |
| Calcium carbonate | 20 |
| Red oxide | 3 |
| Aldehyde amine accelerator | 1 |

30 parts by weight of this compound were dissolved in 70 parts of benzene. The resulting cement was sufficiently thin to be used for the preparation of balloons by dipping. A similar cement, prepared from untreated rubber, was a soft dough.

Example 8

The cement of Example 7 which was prepared with untreated rubber was thinned with solvent until the viscosity was the same as that of the treated sample. Forms were then dipped in each cement. After six dips in the treated cement, a film thickness of .020 was obtained. The untreated cement required 11 dips to produce a film of the same thickness. Both films vulcanized normally.

Example 9

A 10% rubber cement in benzene was treated with .3% of phenyl hydrazine. After 24 hours the cement was little more viscous than water and could be easily passed through chamois leather under slight pressure. A piece of kid leather impregnated with this cement and dried had increased 15% in weight and was considerably more dense and water proof.

The above examples are merely illustrative of our invention. Other hydrazines and their salts which have been successfully employed and proved to be particularly satisfactory are as follows:

Acetone phenyl hydrazone
N,N' phenyl benzyl hydrazine
Mono-acetyl phenyl hydrazine
The thio urea resulting from the action of phenyl mustard oil on phenyl hydrazine
Phenyl hydrazine formate
Phenyl hydrazine oxalate
o-tolyl hydrazine nitrate
Asymmetrical methyl phenyl hydrazine sulfate
o-xenyl hydrazine sulfate
2:5-dichlorphenyl hydrazine acetate
m-nitrophenyl hydrazine stearate
N,N' b-hydroxy-ethyl phenyl hydrazine benzoate
Asymmetrical diphenyl hydrazine phthalate
Asymmetrical phenyl methyl hydrazine phosphate Other hydrazines which merit special attention are:

Asymmetrical di-tolyl hydrazines
Asymmetrical di-xylyl hydrazines
Asymmetrical di-biphenyl hydrazines
Asymmetrical di-naphthyl hydrazines
Asymmetrical phenyl tolyl hydrazines
Asymmetrical phenyl biphenyl hydrazines
Asymmetrical phenyl naphthyl hydrazines
Asymmetrical tolyl naphthyl hydrazines
Asymmetrical di-benzyl hydrazines
Asymmetrical phenyl benzyl hydrazines
Asymmetrical di-hydroxyphenyl hydrazines
Asymmetrical di-chlorphenyl hydrazines
Asymmetrical di-p-aminophenyl hydrazines
Asymmetrical phenyl phenol hydrazines
Asymmetrical tolyl phenol hydrazines
Asymmetrical di-anisyl hydrazines
Asymmetrical phenyl anisyl hydrazines
Asymmetrical methyl phenyl hydrazines
Mono xylyl hydrazines
Mono biphenyl hydrazines
Mono hydroxy phenyl hydrazines
Mono benzyl hydrazines
Mono chlorphenyl hydrazines
Mono aminophenyl hydrazines
Mono anisyl hydrazines
Mono methyl hydrazines
Mono lauryl hydrazines
Dichlorphenyl hydrazines
Nitrophenyl hydrazines The above hydrazines and other hydrazines heretofore mentioned may be employed as the free bases or as salts of any acid reacting compound which is sufficiently strongly acid to react with the hydrazines to form the salts. Among the acid substances which may be employed to form the salts are:

Phenol
b-naphthol
Cresols
Alpha naphthol
Xylenols
Catechol
Dihydroxy naphthalenes
Dihydroxy biphenyls
Formic acid
Stearic acid
Oxalic acid
Acetic acid
Benzoic acid
Phthalic acid
Propionic acid
Butyric acid
Oleic acid
Palmitic acid
Sulfonic acids
Naphthoic acid
Phenyl benzoic acid
Phenyl naphthoic acid
Naphthyl benzoic acid
Naphthyl naphthoic acid
Halogen substituted acids
Chlor acetic acids (mono- & di-)
Anthranoic acids
Hydrochloric acid
Nitric acid
Sulfuric acid
Phosphoric acid
Sulphur dioxide
Carbon dioxide
Ethyl sulfonic acid
Dithiocarbamic acid of o-tolyl hydrazine
Other dithiocarbamic acids It will be apparent that a wide variety of hydrazine compounds and their salts may be employed. Within the limits of the type formula

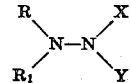

as defined hereinbefore, the components R, R₁ and X may represent methyl, ethyl, propyl, butyl, isobutyl, tertiary butyl, amyl, isoamyl, allyl, crotyl, butylene, lauryl, stearyl or other saturated or unsaturated alkyl groups or may be benzyl ring substituted benzyl, naphthyl methyl or other aralkyl groups or may be substituted or unsubstituted aromatic radicals such as dimethylphenyl, ethylphenyl, nitrophenyl, chlorphenyl, aminophenyl, chlornaphthyl, nitronaphthyl, alkylnaphthyl, biphenyl, alkylbiphenyl, chlorbiphenyl, nitrobiphenyl, aminobiphenyl, cyclohexyl, and the like, or other groups which are generally known to be aliphatic or aromatic in nature.

The hydrazines of our invention and their salts are in general well known compounds and the methods of preparing the same are also well known and described in the literature. The salts will generally be prepared by adding the acid compound directly to the hydrazine or by fusing the hydrazine and the acid compound together or by reacting them in a non-aqueous solvent such as dry benzene, ether and the like. Any acid substances either organic or inorganic of a strength sufficient to form a salt under such circumstances may be employed to form the corresponding salt which salt will be effective for our purpose.

In employing these substances, the hydrazine derivative may be added directly to the rubber or may be added to the cement. If not added to the rubber on a mixing mill, it will usually be found advantageous to add the hydrazine to the solvent at the time the rubber is added, since the rate of solution will be materially increased by the presence of the hydrazine. If desired, fillers may also be added to the rubber or to the cement. It has been found, however, that certain substances such as carbon black and sulfur, retard the rate of solution of the rubber or thinning of the cement. In such cases, greater concentrations of the hydrazine compound will be required if such substances are present in sufficient amounts to prevent the obtention of the desired viscosity. However, it will usually be found advantageous to add the hydrazine to the cement and permit the viscosity to decrease to the desired point before adding such substances as carbon black and sulfur to the cement.

Various mixtures of the hydrazine derivatives and salts may also be employed if desired. For example, mixtures of a free base of the hydrazine and a salt of the free base may be added or the hydrazine may be added and later may be converted to the salt by addition of acid to the cement. In other cases, the hydrazine may be converted into reaction products in the cement. For example, phenyl hydrazine may be added to the cement and later converted to a hydrazone by treatment with aceto acetic ester. The resulting hydrazone will be a less active thinning agent and have less odor than phenyl hydrazine itself.

The cements, produced in accordance with our invention, are useful for many purposes such as adhesives, impregnating materials, dipping or spreading cements, binders when mixed with wood flour, cork, cotton linters, wool, asbestos and similar material. They are useful for waterproofing materials. They may be employed in the production of rubber isomers or derivatives, in which case, a material advantage will be gained by greatly reducing the amount of solvent required.

While we have disclosed the preferred embodiments of our invention, it will be readily apparent to those skilled in the art that many changes and variations may be made therein without departing from the spirit of our invention. Accordingly, the scope of our invention is to be limited solely by the appended claims construed as broadly as is permissible in view of the prior art.

We claim:
1. The method of reducing the viscosity of unvulcanized rubber solutions which comprises the step of subjecting the rubber to the action of a small amount of an unsymmetrically substituted hydrazine compound selected from the group of hydrazines having the formula

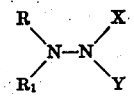

wherein R represents an alkyl, aralkyl or aryl nucleus; $R_1$ represents hydrogen or an alkyl, aralkyl or aryl nucleus; X represents hydrogen, one valence of a doubly bonded carbon atom or an alkyl, aralkyl or aryl nucleus but is of a different class than R when $R_1$ is hydrogen; and Y represents hydrogen or one valence of a doubly bonded carbon atom; and salts of such hydrazines, for a length of time sufficient to decrease its viscosity.

2. The method of preparing a solution of rubber in an organic solvent which comprises dissolving unvulcanized rubber in a volatile organic solvent containing a small amount of an unsymmetrically substituted hydrazine compound selected from the group of hydrazines having the formula

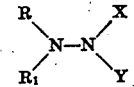

wherein R represents an alkyl, aralkyl or aryl nucleus; $R_1$ represents hydrogen or an alkyl, aralkyl or aryl nucleus; X represents hydrogen, one valence of a doubly bonded carbon atom or an alkyl, aralkyl or aryl nucleus but is of a different class than R when $R_1$ is hydrogen; and Y represents hydrogen or one valence of a doubly bonded carbon atom; and salts of such hydrazines, the rubber containing insufficient amounts of sulfur and carbon black to neutralize the dissolving and viscosity reducing action of the hydrazine compound.

3. The method of reducing the viscosity of unvulcanized rubber solutions which comprises the step of subjecting the rubber to the action of a small amount of unsymmetrically substituted hydrazine compound containing the hydrazine nucleus for a length of time sufficient to decrease its viscosity and in the absence of sufficient amounts of compounding ingredients to neutralize the viscosity reducing action of the hydrazine compound.

4. The method of reducing the viscosity of unvulcanized rubber solutions which comprises the step of subjecting the rubber, prior to the addition of compounding ingredients, to the action of a small amount of an unsymmetrically substituted hydrazine compound containing the hydrazine nucleus for a length of time sufficient to decrease its viscosity.

5. The process of preparing a solution of unvulcanized rubber in an organic solvent which comprises dissolving the rubber in a solvent for unvulcanized rubber in the presence of a small amount of an unsymmetrically substituted hydrazine compound containing the hydrazine nucleus and in the absence of sufficient amounts of compounding ingredients to neutralize the viscosity reducing and dissolving action of the hydrazine compound.

6. The process of preparing a solution of unvulcanized rubber in an organic solvent which comprises dissolving the rubber in a solvent for unvulcanized rubber containing a small amount of an unsymmetrically substituted hydrazine compound containing the hydrazine nucleus and in the absence of sufficient amounts of compounding ingredients to neutralize the viscosity reducing and dissolving action of the hydrazine compound.

7. The method of reducing the viscosity of unvulcanized rubber solutions which comprises the step of subjecting the rubber to the action of a small amount of an unsymmetrically substituted hydrazine compound containing the hydrazine nucleus, having at least one valence of at least one nitrogen of the hydrazine nucleus satisfied by a hydrogen atom and having at least one valence of at least one nitrogen of the hydrazine nucleus satisfied by a carbon atom of an organic group, for a length of time sufficient to decrease its viscosity and in the absence of sufficient amounts of compounding ingredients to neutralize the viscosity reducing action of the hydrazine compound.

8. The method of reducing the viscosity of unvulcanized rubber solutions which comprises the step of subjecting the rubber to the action of a small amount of an unsymmetrically substituted hydrazine compound containing the hydrazine nucleus and at the most two substituent groups, in which each of the substituent groups is an organic group having a carbon atom thereof directly bonded to a nitrogen of the hydrazine nucleus, for a length of time sufficient to decrease its viscosity and in the absence of sufficient amounts of compounding ingredients to neutralize the viscosity reducing action of the hydrazine compound.

9. The method of reducing the viscosity of unvulcanized rubber solutions which comprises the step of subjecting the rubber to the action of a small amount of a mono-substituted hydrazine compound containing the hydrazine nucleus, in which the substituent is an organic group having a carbon atom thereof directly bonded to a nitrogen of the hydrazine nucleus, for a length of time sufficient to decrease its viscosity and in the absence of sufficient amounts of compounding ingredients to neutralize the viscosity reducing action of the hydrazine compound.

10. The method of reducing the viscosity of unvulcanized rubber solutions which comprises the step of subjecting the rubber to the action of a small amount of an unsymmetrically substituted hydrazine, for a length of time sufficient to decrease its viscosity, the said hydrazine being employed as the free base and in the absence of sufficient amounts of compounding ingredients to neutralize the viscosity reducing action of the hydrazine.

11. The method of reducing the viscosity of unvulcanized rubber solutions which comprises the step of subjecting the rubber to the action of a small amount of an unsymmetrically substituted hydrazine, having at least one valence of at least one nitrogen of the hydrazine nucleus satisfied by a hydrogen atom and having at least one valence of at least one nitrogen of the hydrazine nucleus satisfied by a carbon atom of an organic group, for a length of time sufficient to decrease its viscosity, the said hydrazine being employed as the free base and in the absence of sufficient amounts of compounding ingredients to neutralize the viscosity reducing action of the hydrazine.

12. The method of reducing the viscosity of unvulcanized rubber solutions which comprises the step of subjecting the rubber to the action of a small amount of an unsymmetrically substituted hydrazine containing at the most 2 substituent groups, in which each of the substituent groups is an organic group having a carbon atom thereof directly bonded to a nitrogen of the hydrazine nucleus, for a length of time sufficient to decrease its viscosity, the said hydrazine being employed as the free base and in the absence of sufficient amounts of compounding ingredients to neutralize the viscosity reducing action of the hydrazine.

13. The method of reducing the viscosity of unvulcanized rubber solutions which comprises the step of subjecting the rubber to the action of a small amount of a mono-substituted hydrazine, in which the substituent is an organic group having a carbon atom thereof directly bonded to a nitrogen of the hydrazine nucleus, for a length of time sufficient to decrease its viscosity, the said hydrazine being employed as the free base and in the absence of sufficient amounts of compounding ingredients to neutralize the viscosity reducing action of the hydrazine.

14. The method of reducing the viscosity of unvulcanized rubber solutions which comprises the step of subjecting the rubber to the action of a small amount of a salt of an unsymmetrically substituted hydrazine, for a length of time sufficient to decrease its viscosity and in the absence of sufficient amounts of compounding ingredients to neutralize the viscosity reducing action of the salt.

15. Solutions of unvulcanized rubber of reduced viscosity wherein the rubber has been subjected to the action of an unsymmetrically substituted hydrazine compound selected from the group of hydrazines having the formula

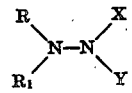

wherein R represents an alkyl, aralkyl or aryl nucleus; $R_1$ represents hydrogen or an alkyl, aralkyl or aryl nucleus; X represents hydrogen, one valence of a doubly bonded carbon atom or an alkyl, aralkyl or aryl nucleus but is of a different class than R when $R_1$ is hydrogen; and Y represents hydrogen or one valence of a doubly bonded carbon atom; and salts of such hydrazines, sufficient in amount and for a sufficient length of time to reduce the viscosity of the rubber and the solution and in the absence of sufficient amounts of compounding ingredients to neutralize the viscosity reducing action of the hydrazine compound.

16. Solutions of unvulcanized rubber of reduced viscosity wherein the rubber has been subjected to the action of an unsymmetrically substituted hydrazine compound containing the hydrazine nucleus, sufficient in amount and for a sufficient length of time to reduce the viscosity of the rubber and the solution and in the absence of sufficient amounts of compound ingredients to neutralize the viscosity reducing action of the hydrazine compound.

17. Solutions of unvulcanized rubber of reduced viscosity wherein the rubber has been subjected to the action of an unsymmetrically substituted hydrazine compound containing the hydrazine nucleus and at the most two substituent groups, in which each of the substituent groups is an organic group having a carbon atom thereof directly bonded to a nitrogen of the hydrazine nucleus, sufficient in amount and for a sufficient length of time to reduce the viscosity of the rubber and the solution and in the absence of sufficient amounts of compounding ingredients to neutralize the viscosity reducing action of the hydrazine compound.

18. The method of reducing the viscosity of unvulcanized rubber solutions which comprises the step of subjecting the rubber to the action of a small amount of phenyl hydrazine for a length of time sufficient to decrease its viscosity and in the absence of sufficient amounts of compounding ingredients to neutralize the viscosity reducing action of said hydrazine.

19. The method of reducing the viscosity of unvulcanized rubber solutions which comprises the step of subjecting the rubber to the action of a small amount of a-naphthyl hydrazine for a length of time sufficient to decrease its viscosity and in the absence of sufficient amounts of compounding ingredients to neutralize the viscosity reducing action of said hydrazine.

20. The method of reducing the viscosity of unvulcanized rubber solutions which comprises the step of subjecting the rubber to the action of a small amount of phenyl dithio carbazimic phenyl hydrazine for a length of time sufficient to decrease its viscosity and in the absence of sufficient amounts of compounding ingredients to neutralize the viscosity reducing action of said hydrazine.

CARROLL CUMMINGS SMITH.
IRA WILLIAMS.